United States Patent
Neugeboren

(10) Patent No.: US 11,283,535 B2
(45) Date of Patent: Mar. 22, 2022

(54) METHOD OF REMOTELY MONITORING THE TIMING PERFORMANCE OF A PTP SLAVE

(71) Applicant: ARRIS Enterprises LLC, Suwanee, GA (US)

(72) Inventor: Yair Neugeboren, Netanya (IL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/692,010

(22) Filed: Nov. 22, 2019

(65) Prior Publication Data
US 2020/0304224 A1 Sep. 24, 2020

Related U.S. Application Data

(60) Provisional application No. 62/821,114, filed on Mar. 20, 2019.

(51) Int. Cl.
| | | |
|---|---|---|
| *H04J 3/06* | (2006.01) | |
| *H04L 12/26* | (2006.01) | |
| *G06F 1/12* | (2006.01) | |
| *H04L 43/0864* | (2022.01) | |

(52) U.S. Cl.
CPC ............. *H04J 3/0673* (2013.01); *G06F 1/12* (2013.01); *H04J 3/0667* (2013.01); *H04L 43/0864* (2013.01)

(58) Field of Classification Search
CPC ......... H04J 3/0673; H04J 3/0667; G06F 1/12; H04L 43/0864
See application file for complete search history.

(56) References Cited

U.S. PATENT DOCUMENTS 9,628,209 B2 4/2017 Kingsley
10,856,242 B2 * 12/2020 Park ...................... H04L 5/0053

OTHER PUBLICATIONS

PCT International Search Report & Written Opinion, RE: Application No. PCT/US2020/023350, dated Sep. 28, 2020.
Mahmood Aneeq et al: "High precision and robustness in network-based clock synchronization using IEEE 1588", Proceedings of the 2014 IEEE Em Erg I Ng Technology and Factory Automation ( ETFA), IEEE, Sep. 16, 2014.

(Continued)

*Primary Examiner* — Chandrahas B Patel
(74) *Attorney, Agent, or Firm* — Chernoff, Vilhauer, McClung & Stenzel, LLP

(57) ABSTRACT

In some embodiments, a method is performed after locking a first clock of a computing device to synchronize with a second clock associated with a first device where a difference between the first clock and the second clock is determined during the locking. The method measures a path delay to a second device based on sending messages including first timestamps of the first clock to the second device and receiving messages including second timestamps of a third clock from the second device. A third message is sent to the second device that includes a third timestamp of the first clock that has been locked to the second clock, wherein the third message includes the path delay, and wherein the third timestamp and the path delay allow the second device to analyze a lock quality of the first clock to the second clock based on a time of the third clock.

18 Claims, 6 Drawing Sheets

(56) References Cited

OTHER PUBLICATIONS

Guangquan Wang China United Network Communications Group Company Limited PR China: "Synchronization performance monitoring with Probe;C 1767", ITU-T Draft . Study Period 2013-2016, International Telecommunication Union, Geneva ; CH, vol. 13/15, Feb. 2, 2016 (Feb. 2, 2016).

* cited by examiner

METHOD OF REMOTELY MONITORING THE TIMING PERFORMANCE OF A PTP SLAVE

CROSS-REFERENCES TO RELATED APPLICATIONS

The present disclosure claims priority to U.S. Provisional App. No. 62/821,114, entitled "A METHOD OF REMOTELY MONITORING THE TIMING PERFORMANCE OF A PTP SLAVE", filed Mar. 20, 2019, the contents of which is incorporated herein by reference in its entirety.

BACKGROUND

A precision time protocol (PTP) clock performs frequency and phase recovery based on received and requested time stamps from a master clock. To perform the recovery, a PTP slave device that is located in a network locks to a PTP master device. The locking process locks the PTP slave clock to the PTP master clock thereby synchronizing the PTP slave clock with the PTP master clock. In timing distribution systems, it is important to be able to monitor the timing performance of a PTP slave clock. There are some factors that can influence the lock quality of the PTP slave clock to its PTP master clock. For example, packet delay variation (PDV) in the network may affect the lock quality between the PTP master clock and the PTP slave clock. Also, delay asymmetry between the PTP master device and the PTP slave device may affect the lock quality. Further issues may include holdover situations where the PTP slave cannot reach the PTP master device, which means the PTP slave clock is not locked to the PTP master clock.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
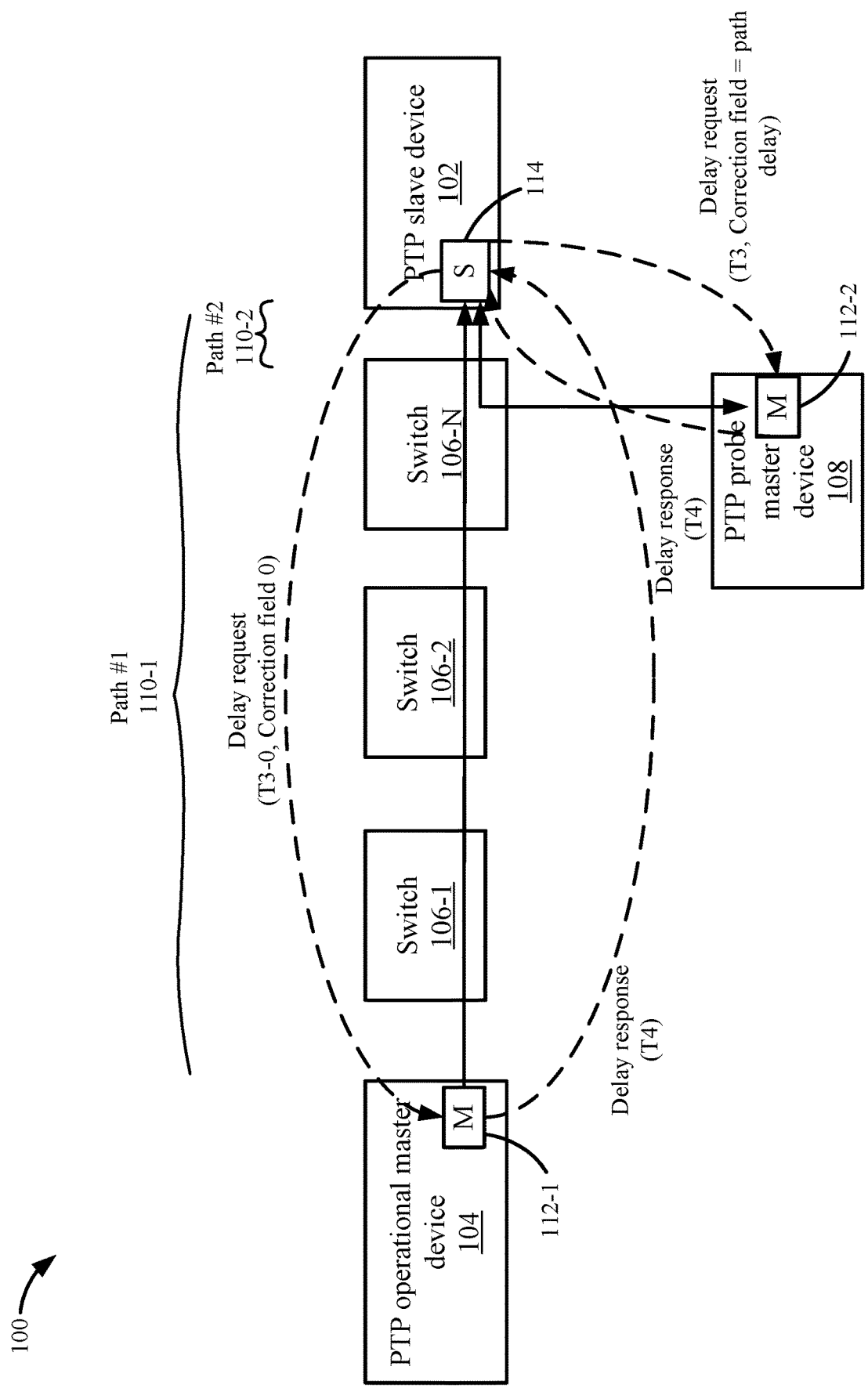
FIG. 1 depicts a simplified system for performing timing synchronization according to some embodiments.

Described herein are techniques for a timing synchronization system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A slave device, such as a precision time protocol (PTP) slave device, may include a slave clock that is synchronized with a master clock that is located in a master device, such as a PTP master device. A protocol, such as PTP, may be a timing system that may be used in applications such as in a cable network with a remote PHY (RPHY) device. PTP may be implemented based on Institute of Electrical and Electronics Engineers (IEEE) standards, such as IEEE standard 1588-2008. The PTP protocol distributes time and frequency through a network, such as a packet network. Time synchronization is a synchronization of time between the slave device in a network and the master device, and frequency synchronization is the synchronization of frequency of the slave clock with the master clock. The protocol creates a master-slave relationship between a grand master clock and slave devices through the network.

In some embodiments, a slave device may lock its slave clock to an operational master clock of an operational master device. Then, to test the lock quality of the slave clock to its master clock, the slave device may communicate with a probe master device that includes a probe master clock. The probe master device may be placed in the network, such as near the slave device (e.g., in the last network hop to the slave device or the last couple of hops). This may reduce the influence of packet delay variation and asymmetry between the slave device and the probe master device. The slave device may receive a sync message from the probe master device with a timestamp, referred to as a T1 time. The slave device may note the time that the sync message is received as a time T2. The slave device sends a delay request message that includes a time stamp, referred to as a T3 time, of the slave clock. The slave device receives a delay response from the probe device with a time stamp, referred to as a T4 time, of the probe master clock. From the delay request and the delay response, the slave device can then calculate the path delay between the slave device and the probe device. For example, the path delay is $((T2-T1)+(T4-T3))/2$.

The slave device then sends a delay request with the T3 time and the path delay to the probe master device. The slave device may insert the path delay a field of the delay request message, such as in the T3 correction field. The probe master device can properly monitor the clock of the slave device using the T3 time and the calculated path delay that is inserted in the delay request. For example, the probe master device can then use the T3 time and the path delay to verify the lock quality of the slave clock with the operational master clock. That is, the T3 time+path delay=the current time of the slave clock. The probe master device can compare the current time of the slave clock to the current time of the probe master clock. The above allows the monitoring of the slave clock without requiring an interface to a PTP probe, such as a one pulse-per-second (PPS) interface to a PTP probe, or requiring the slave device to operate as a master clock to synchronize with a probe slave clock via PTP. Also, the path delay is inserted in a field that exists in the PTP protocol and PTP probe device is configured to calculate the current time of the slave clock using the correction field.

System Overview

FIG. 1 depicts a simplified system 100 for performing timing synchronization according to some embodiments. System 100 includes a PTP operational master device 104, switches 106-1 to 106-N, a PTP slave device 102, and a PTP probe master device 108. Precision time protocol is used to synchronize timing throughout a network. Although precision time protocol is discussed, it will be understood that other protocols may be used that synchronize timing throughout the network.

PTP operational master device 104 may be a device that includes a master clock 112-1. Master clock 112-1 may be based on a reference clock, such as a global navigation satellite system (GNSS) clock or another source of time. Master clock 112-1 may be an operational master clock that is used by PTP slave device 102 to synchronize its slave clock 114.

PTP slave device 102 may be located in a network. A path #1 110-1 is between PTP slave device 102 and PTP operational master device 104. In some embodiments, PTP slave device 102 may be located in the network and is remotely located from PTP operational master device 104. Switches 106-1 to 106-N may be network devices that can couple PTP operational master device 104 to PTP slave device 102 through path #1 110-1 in the network.

PTP probe master device 108 may be used to test the quality of the lock of slave clock 114 with operational master clock 112-1. The quality of the lock is measured by the difference of the adjusted time of slave clock 114 to the time of a timing source connected to probe master clock 112-2, which is connected to the timing source used by operational master clock 112-1. As will be discussed in more detail below, PTP probe master device 108 includes a probe master clock 112-2 that is used to check the lock quality of slave clock 114. In some embodiments, PTP probe master device 108 is connected to PTP slave device 102 in a location that is closer to PTP slave device 102 than a location of PTP operational master device 104 to PTP slave device 102. For example, PTP probe master device 108 may be connected to PTP slave device 102 through one of switches 106-1 to 106-N. In some embodiments, PTP probe master device 108 is connected to the last hop switch 106-N to PTP slave device 102 in a path #2 110-2. Although PTP probe master device 108 may be depicted as being in the last hop in path #1 110-1 or connected to switch 106-N, PTP probe master device 108 may be located in other locations and does not have to be located in path #1 110-1. However, PTP probe master device 108 may be located in a location in which packet delay variation and asymmetry in the request and response process is minimized. For example, by locating PTP probe master device 108 in switch 106-N, a single hop between switch 106-N and PTP slave device 102 may limit packet delay variation and asymmetry in path #2 110-2 compared to path #1 110-1, which is through multiple switches 106-1 to 106-N that can cause more packet delay variation and asymmetry.

Before checking the lock quality, PTP slave device 102 first locks slave clock 114 to operational master clock 112-1. To synchronize slave clock 114 with operational master clock 112-1, PTP slave device 102 may calculate a roundtrip delay between PTP slave device 102 and PTP operational master device 104. For example, PTP slave device 102 may receive a sync message from PTP operational master device 104 with a T1 time from operational master clock 112-1, which is a timestamp when the sync message is sent. PTP operational master device 104 may determine the time based on a timing source, such as a GNSS clock. PTP slave device 102 may note the time that the sync message is received as a time T2. PTP slave device 102 sends a delay request message that includes a time stamp, referred to as a T3 time, of slave clock 114. PTP slave device 102 receives a delay response from PTP operational master device 104 with a time stamp of operational master clock 112-1 when the delay request is received, referred to as a T4 time. From the times, the slave device can then calculate the path delay between PTP operational master device 104 and PTP slave device 102. For example, the path delay in path #1 110-1 is $((T2-T1)+(T4-T3))/2$. As can be seen, PTP slave device 102 assumes the path delay is symmetrical in both directions. Although this method of determining the path delay is described, other methods may be appreciated.

PTP slave device 102 can use the path delay to determine the correct time in which slave clock 114 should be set. For example, a time of operational master clock 112-1 plus the path delay is the correct time of operational master clock 112-1. PTP slave device 102 may lock slave clock 114 to the correct time of operational master clock 112-1. For example, PTP operational master device 104 may send sync messages with a time, which is used by PTP slave device 102 to lock a time of slave clock 114. Thus, PTP slave device 102 may adjust slave clock 114 based on the difference between the time of slave clock 114 and the time of operational master clock 112-1. PTP slave device 102 eventually locks slave clock 114 to operational master clock 112-1. The phase of the clock frequency may also be adjusted in the locking process. When locked, the time and phase of slave clock 114 is locked to the time and frequency of operational master clock 112-1.

As discussed above, PTP slave device 102 should check the lock quality of slave clock 114. That is, PTP slave device 102 may check whether the synchronized timing and frequency of slave clock 114 is accurate. To perform the check, PTP slave device 102 communicates with PTP probe master device 108.

Conventionally, PTP slave device 102 may check the lock quality of slave clock 114 using different methods. For example, PTP slave device 102 may output slave clock 114 to an external probe using a dedicated interface, such as a one pulse-per-second interface. The probe compares the time and phase of slave clock 114 to its master clock. This is usually done by having the master clock of the probe connected to the same reference clock as operational master clock 112-1. Although this method may monitor slave clock 114, PTP slave device 102 needs to have an external probe interface, such as a 1 PPS interface. Also, PTP slave device 102 and PTP probe master device 108 needs to be accessed to install the connection, which may be hard when PTP slave device 102 is remotely located from a headend or core, such as in a remote physical device or small cell devices.

In a second approach, PTP slave device 102 may function as a boundary clock where PTP slave device 102 operates slave clock 114 as a master clock that communicates with a PTP probe that includes a slave clock. The PTP probe compares the frequency and phase of its slave clock to the master clock of PTP slave device 102. The PTP probe is connected to the same reference clock as operational master clock 112-1 to check the timing of master clock of PTP slave device 102. However, a problem exists in that PTP slave device 102 may not support acting as a boundary clock. That is, PTP slave device 102 may not be able to act as a master clock. Additionally, the PTP probe is remotely located from PTP slave device 102 and the path may suffer from asymmetry and packet delay variation, which would affect the accuracy of the testing of the master clock of PTP slave device 102. Due to the above factors, it is important to monitor the accuracy of the PTP slave clock compared to its PTP master clock and to be able to identify any of the above issues without using a PPS interface and operating PTP slave device 102 as a boundary device.

With conventional techniques, there is no implementation for sending timestamp information to monitor slave clocks in an outgoing delay request messages. Similarly, while IEEE 1588 describes a method for measuring link propagation delay, nowhere does IEEE 1588 address measuring delay on a path level with intermediate nodes in the path, whereas IEEE 1588 is limited to measuring delay of a link connecting adjacent nodes.

To overcome the above disadvantages, some embodiments use PTP probe master device 108 to test the lock quality of slave clock 114. PTP slave device 102 does not attempt to lock slave clock 114 to probe master clock 112-2. Rather, PTP probe master device 108 monitors the lock quality of slave clock 114 to operational master clock 112-1. PTP slave device 102 can communicate with PTP probe master device 108 to calculate the path delay based on T1 time, T2 time, T3 time, and the T4 time. For example, PTP slave device 102 may receive a sync message from PTP probe master device 108 with a T1 time from probe master clock 112-2, which is a timestamp when the sync message is sent. PTP probe master device 108 may determine the time based on a timing source, such as a GNSS clock. PTP slave device 102 may note the time that the sync message is received as a T2 time. PTP slave device 102 sends a delay request message that includes a time stamp, referred to as a T3 time, of slave clock 114. PTP slave device 102 receives a delay response from PTP probe master device 108 with a time stamp of probe master clock 112-2 when the delay request is received, referred to as a T4 time. From the times, PTP slave device 102 can then calculate the path delay between PTP probe master device 108 and PTP slave device 102. For example, the path delay in path #2 110-2 is ((T2−T1)+(T4−T3))/2. PTP slave device 102 may calculate the path delay over a number of delay request/delay response round trips. The path delay assumes a symmetrical delay in both directions, but since PTP probe master device 108 may be located closer to PTP slave device 102, the packet delay variation and the asymmetry may be limited.

Once calculating the path delay, PTP slave device 102 adds the path delay between slave clock 114 and probe master clock 112-2 to the delay request. In some embodiments, PTP slave device 102 adds the path delay to a correction field in the delay request that includes the T3 time. The correction field may be a field that may not typically be used when checking the lock quality. The correction field may be typically used by clocks, such as transparent clocks in 1588, to add a correction to the timestamps due to an internal delay in the clock. Transparent clocks may be in switches. The correction field is typically not used by slave clocks. However, PTP probe master device 108 may be configured to use the T3 time and the path delay in the correction field to determine the adjusted time for slave device 114 to check the quality of the lock for slave clock 114. For example, PTP probe master device 108 adds the path delay to the T3 time to calculate a current time of slave clock 114. That is, the time T3 in which the delay request is sent in addition to the path delay should be the current time. Then, PTP probe master device 108 compares the current time of probe master clock 112-2 to the calculated current time for slave clock 114. Based on the comparison, PTP probe master device 108 can check the quality of slave clock 114. For example, because PTP probe master device 108 is connected to the same reference clock as PTP operational master device 104, the comparison may determine any timing inaccuracies in slave clock 114. Because the path delay is used and path #2 110-2 may suffer from minimal packet delay variation or asymmetry, the path delay may be an accurate reading of the path delay. Thus, the adjusted time for slave clock 114 may yield an accurate current time that may be close to or exactly the same as the time and phase as probe master clock 112-2. If the difference between the adjusted current time of slave clock 114 and the current time of probe master clock 112-2 meets a threshold (e.g., is below and/or equal to), then PTP probe master device 108 can confirm the accuracy of slave clock 114.

Connecting PTP probe master device 108 to PTP slave device 102 without requiring a direct physical connection relieves a requirement that PTP slave device 102 includes an interface of slave clock 114 and also does not require PTP slave device 102 to operate as a boundary clock to advertise its clock to a remote PTP slave probe. The only requirement is that PTP slave device 102 inserts the T3 time in delay request messages along with the path delay in the correction field, which PTP slave devices 102 have the capability to perform based on communicating with operational master clock 112-1. The following will now describe the process in more detail.

PTP Slave Device

Figure 2:
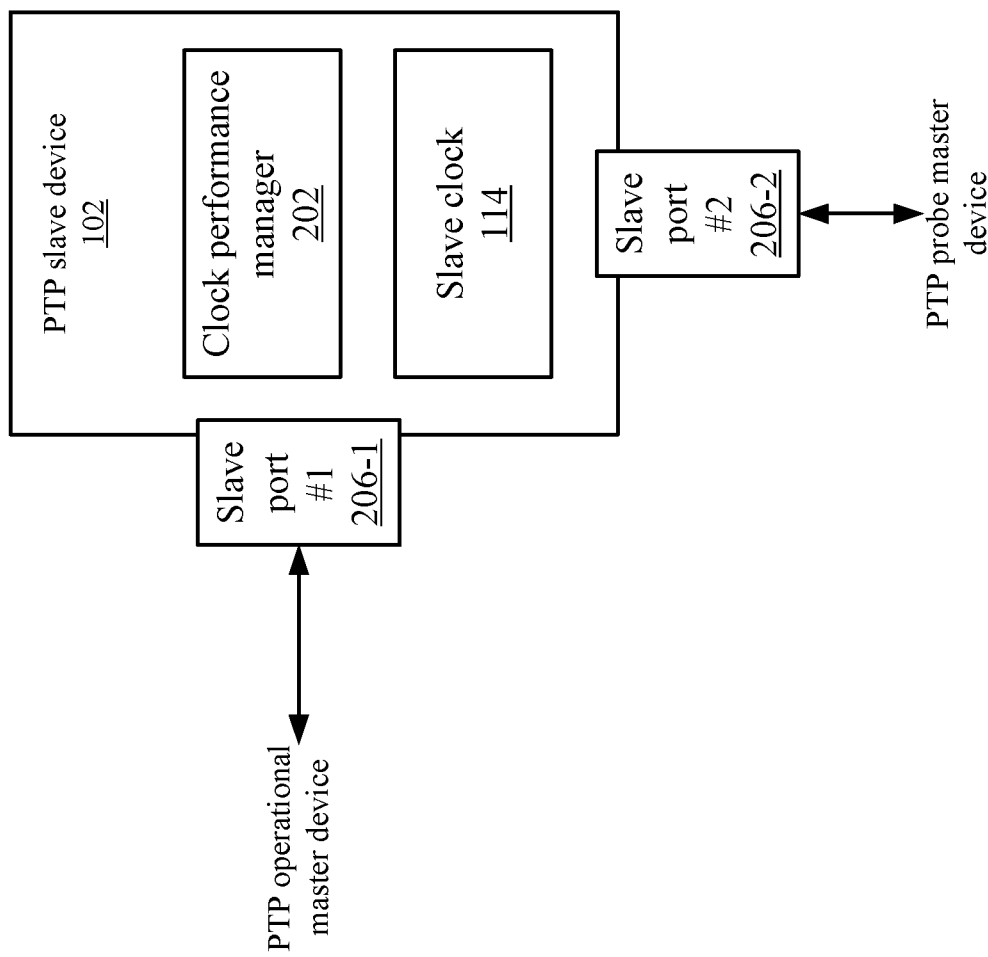
FIG. 2 depicts a more detailed example of a Precision Time Protocol (PTP) slave device according to some embodiments.

FIG. 2 depicts a more detailed example of PTP slave device 102 according to some embodiments. PTP slave device 102 includes multiple ports to connect to PTP operational master device 104 and PTP probe master device 108. For example, PTP slave device 102 includes a slave port #1 206-1 that connects to PTP operational master device 104. Also, PTP slave device 102 includes a slave port #2 206-2 that connects to PTP probe master device 108.

Clock performance manager 202 may select a port depending on whether PTP slave device 102 is locking to operational master clock 112-1 or testing the quality of the lock with probe master clock 112-2. For example, clock performance manager 202 may use slave port #1 206-1 to lock slave clock 114 to operational master clock 112-1. Then, clock performance manager 202 may use slave port #2 206-2 to test the lock quality of slave clock 114 with probe master clock 112-2. Clock performance manager 202 may be configured such that slave port #2 206-2 is not used in an algorithm to select the best master clock Some methods may be to configure slave port #2 206-2 with a lower priority, or put a clock class/quality value on probe master clock 112-2 such that it will not be selected, etc. Rather, clock performance manager 202 uses slave port #2 206-2 to test the quality of the lock of slave clock 114 and does not lock the time of slave clock 114 to probe master clock 112-2.

Figure 3:
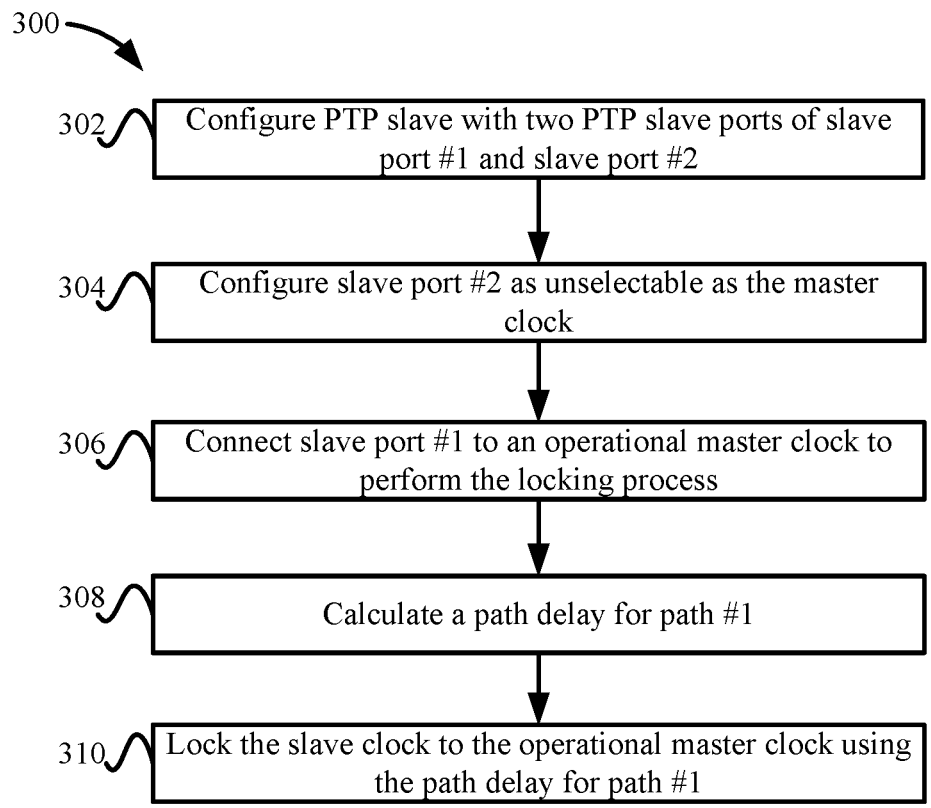
FIG. 3 depicts a simplified flowchart of the process of configuring ports on the PTP slave device to lock to operational master clock according to some embodiments.

FIG. 3 depicts a simplified flowchart 300 of the process of configuring ports 206 on PTP slave device 102 to lock to operational master clock 112-1 according to some embodiments. At 302, PTP slave device 102 is configured with two PTP slave ports 206-1 and 206-2. At 304, PTP slave device 102 configures slave port #2 206-2 as unselectable as the master clock.

At 306, clock performance manager 202 connects slave port #1 206-1 to operational master clock 112-1 to perform the locking process. At 308, clock performance manager 202 calculates a path delay for path #1 110-1. The path delay takes the round-trip time from PTP slave device 102 and PTP operational master device 104, and divides the round-trip time by two. After determining the path delay, at 310, PTP slave device 102 locks slave clock 114 to operational master clock 112-1 using the path delay for path #1 110-1. When locked to operational master clock 112-1, a time of slave clock 114 is adjusted based on a time of operational master clock 112-1 and the path delay, such as the path delay is added to a time T4 from operational master clock 112-1 (e.g., time T4+path delay=current time) to determine the correct current time. Slave clock 114 may ignore the value in the correction field that the probe master device copies to the correction field from the delay request message when receiving the T4 timestamp from the probe master device in the delay response message, and does not use the correction field to correct the T4 time.

Lock Quality Testing

Figure 4:
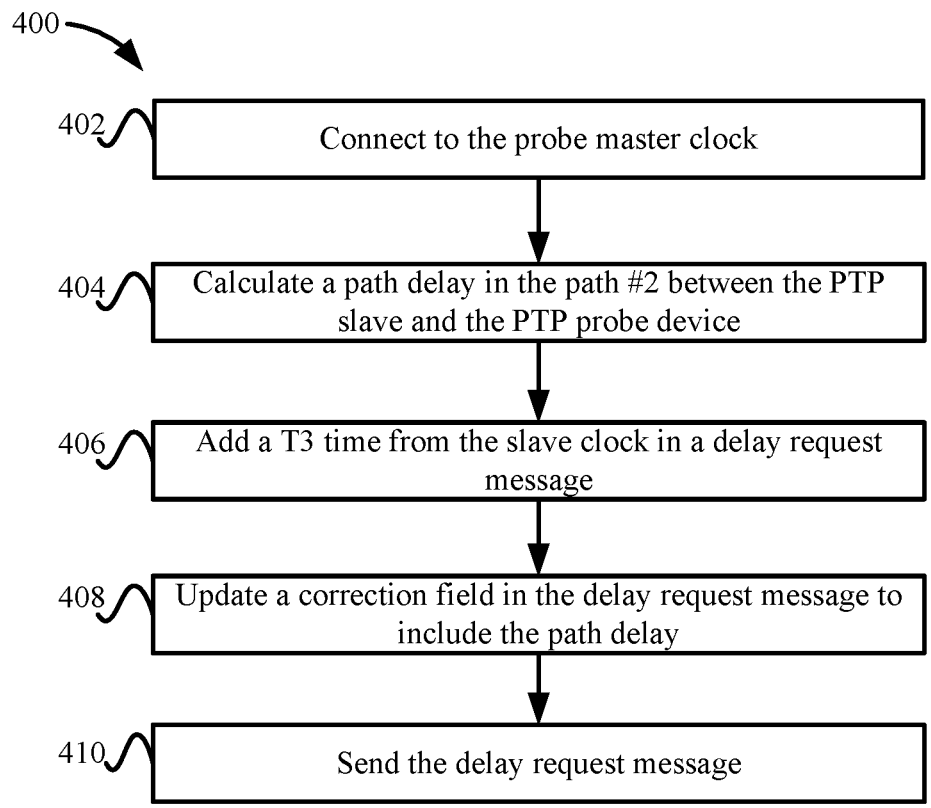
FIG. 4 depicts a simplified flowchart for testing the lock quality of a slave clock according to some embodiments.

After locking slave clock 114 to operational master clock 112-1, clock performance manager 202 may test the lock quality. FIG. 4 depicts a simplified flowchart 400 for testing the lock quality of slave clock 114 according to some embodiments. At 402, PTP slave device 102 connects to probe master clock 112-2 through slave port #2 206-2. At 404, PTP slave device 102 calculates a path delay in the path #2 between PTP slave device 102 and PTP probe master device 108.

At 406, PTP slave device 102 adds a T3 time from slave clock 114 in a delay request message. At 408, PTP slave device 102 updates a correction field in the delay request message to include the path delay. At 410, PTP slave device 102 sends the delay request message.

PTP probe master device 108 receives the T3 time and the path delay and can test the lock quality of slave clock 114. For example, PTP probe master device 108 uses the T3 time and the path delay to adjust the time of slave clock 114 to take into account the path delay to send the delay request. This results in the current time of slave clock 114. Then, PTP probe master device 108 compares the current time of probe master clock 112-2 to the adjusted T3 time (e.g., the current time of slave clock 114) to determine the accuracy of slave clock 114. For example, if the adjusted T3 time is similar to the time of probe master clock 112-2, then the lock quality of slave clock 114 is high. However, if the adjusted T3 time is not close to the time of probe master clock 112-2, then PTP probe master device 108 determines that the lock quality is low. PTP probe master device 108 may use a threshold to test the lock quality. For example, if the difference between the adjusted T3 time and the time of probe master clock 112-2 is above a threshold, PTP probe master device 108 may determine the lock quality is not good, and if the difference is below a threshold, PTP probe master device 108 may determine the lock quality is good.

PTP probe master device 108 may output a result of the comparison. It is noted that the above process may be performed multiple times over time to test the lock quality of slave clock 114. For example, the lock quality check may be performed one or more times. The result may be based on a summary of the comparisons, such as an average of the differences or how many times a difference is above or below the threshold, but various methods may be used. Then, after determining a lock quality, the process may be performed after another interval, such as an hour later.

Figure 5:
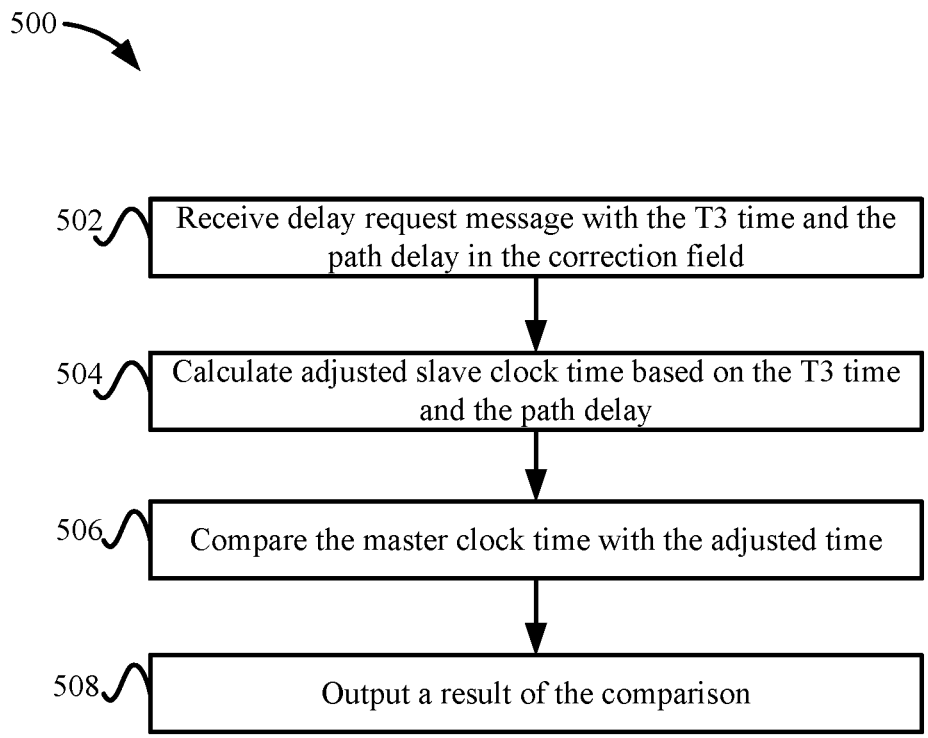
FIG. 5 depicts a simplified flowchart of a method for testing the quality of the slave clock at a PTP probe master device according to some embodiments.
Figure 6:
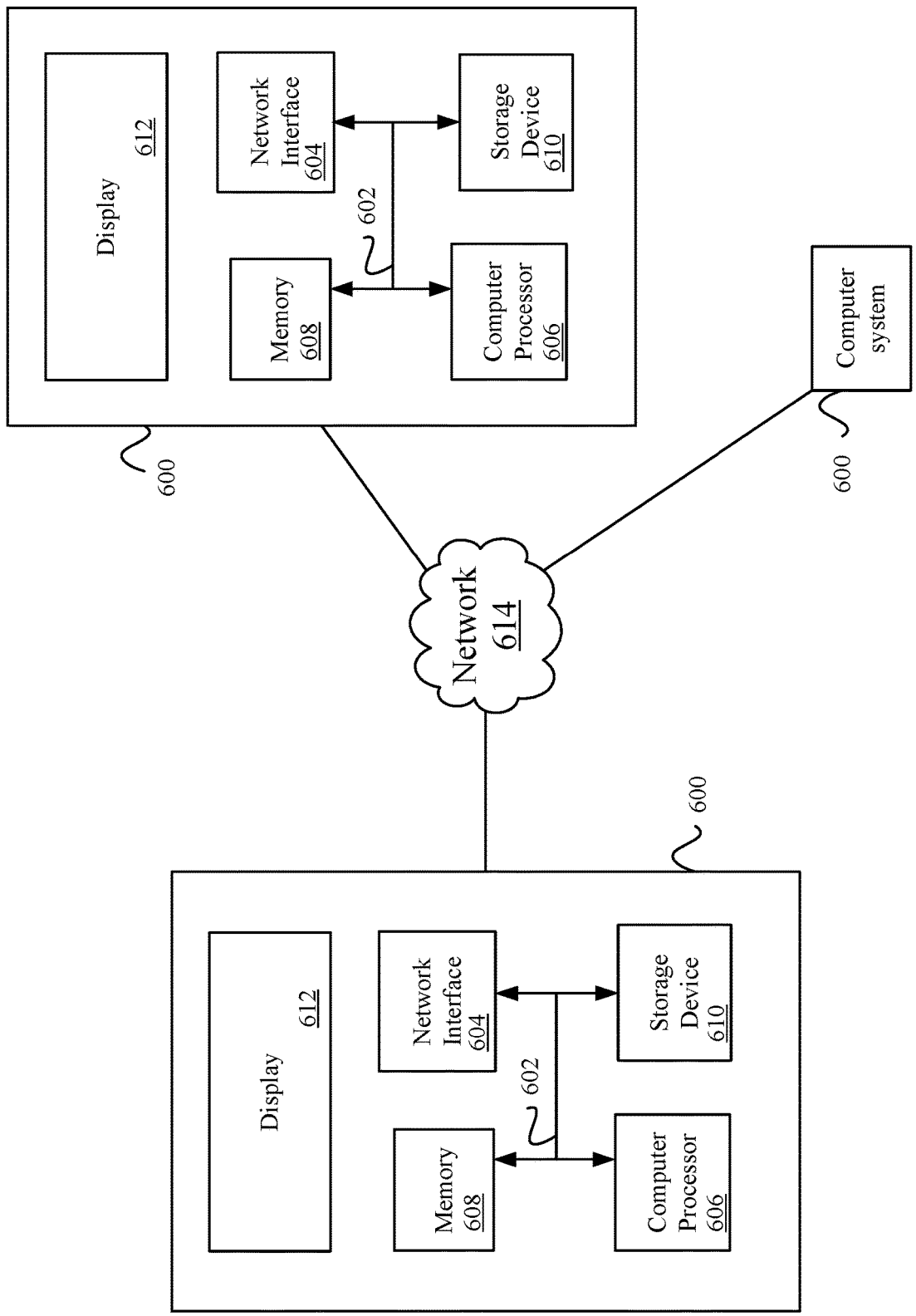
FIG. 6 illustrates an example of special purpose computer systems according to some embodiments.

FIG. 5 depicts a simplified flowchart 500 of a method for testing the quality of slave clock 114 at PTP probe master device 108 according to some embodiments. At 502, after PTP slave device 102 calculates a path delay, PTP probe master device 108 receives a delay request message with the T3 time and the path delay in the correction field.

At 504, PTP probe master device 108 calculates an adjusted slave clock time based on the T3 time and the path delay that is located in the correction field. For example, PTP probe master device 108 may add the path delay to the T3 time to determine the adjusted T3 time. At 506, PTP probe master device 108 compares the master clock time with the adjusted time.

At 508, PTP probe master device 108 outputs the result of the comparison. For example, PTP probe master device 108 may compare a result of the comparison to a threshold to determine the quality or the accuracy of slave clock 114.

EXAMPLE

The following will describe an example of testing the lock quality of slave clock 114. The test may use the following parameters:

D-ds-o→the actual downstream (DS) nominal delay between operational master clock 112-1 and slave clock 114;
D-us-o→the actual upstream (US) nominal delay between slave clock 114 and operational master clock 112-1;
Asym-o→the asymmetry path difference between operational master clock 112-1 and slave clock 114;
D-ds-p→the downstream delay between probe master clock 112-2 and slave clock 114;
D-us-p→the upstream delay between slave clock 114 and the probe master clock 112-2;
Asym-o→the asymmetry path difference between probe master clock 112-2 and slave clock 114;
T-m-o→the time of operational master clock 112-1;
Tsa-p→the time of slave clock 114 analyzed by PTP probe master device 108; and
Ts→the time of slave clock 114 which is locked to operational master clock 112-1.

Assuming there is path asymmetry between slave clock 114 and operational master clock 112-1, PTP slave device 102 calculates the path delay from operational master clock 112-1 without knowing the asymmetry factor as per:

$$Ts=Tm\text{-}o+(D\text{-}ds\text{-}o+D\text{-}us\text{-}o+A\text{-}asym\text{-}o)/2$$

PTP slave device 102 calculates the nominal mean path delay without the unknown asymmetry value and adjusts its slave clock 114 accordingly which leads to a delay asymmetry error with a value of half the path asymmetry:

$$Ts=Tm\text{-}o+(A\text{-}asym\text{-}o/2)$$

Note that slave clock 114 is inaccurate compared to operational master clock 112-1 with half of the path asymmetry value. This error results due to the two path delays in the upstream direction and the downstream direction being asymmetrical. The calculation of the path delay assumes these delays are symmetrical.

Now, assuming there is a very small path asymmetry between PTP slave device 102 and PTP probe master device 108. PTP slave device 102 may calculate the path delay from PTP probe master device 108 accurately as:

$$Ts=(D\text{-}ds\text{-}p+D\text{-}us\text{-}p)/2=D\text{-}us\text{-}p$$

In this example, PTP slave device 102 sends its time (T3) to PTP probe master device 108 and embeds the calculated path delay in the correction field. PTP probe master device 108 can receive the following information from the delay request (T3, correction field), which corresponds to (Ts, D-us-p) with a delay of D-us-p—the actual path delay). Therefore, the time of slave clock 114 analyzed by PTP probe master device 108 is:

$$Tsa\text{-}p=(Ts\text{-}D\text{-}us\text{-}p)+D\text{-}us\text{-}p=Tm\text{-}o+(A\text{-}asym\text{-}o/2)$$

The probe will reflect, the half of the operational asymmetry value as the offset measured between slave clock 114 and operational master clock 112-1.

Thus, the performance of slave clock 114, that is locked to operational master clock 112-1, can be monitored by a clock probe that exchanges IEEE 1588 standard messages with the slave clock 114. PTP probe master device 108 operates as a master clock and uses the timestamp values in the messages to determine the performance of slave clock 114. The quality of the performance monitoring is increased as the path asymmetry and packet delay variation are minimized. Operational master clock 112-1 and probe master clock 112-2 share a common timing source, such as a GNSS timing source, to triangulate the performance of slave clock 114.

As disclosed, time stamps in standard IEEE 1588 messages may be used to remotely monitor the performance of the slave clock. Also, PTP probe master device 108 may or may not be in the message transfer data path between operational master clock 112-1 and slave clock 114. Operational master clock 112-1 and PTP probe master device 108 remotely share a common timing source to triangulate the performance of the slave clock.

Providing a manner for monitoring the performance of clocks may enable troubleshooting the distribution of timing in packet networks. As more packet-based services are deployed, including 5G wireless services, it will be valuable to be able to monitor clock performance and detect problems as quickly as possible. The disclosed techniques use timestamps in standard messages to remotely monitor a slave clock with the probe out of the master clock to slave clock data path, enabling remote monitoring of a packet slave clock. With the demand for packet clock performance, monitoring needs continue to expand with 5G deployments.

Example Embodiments

In some embodiments, a method is performed after locking a first clock of a computing device to synchronize with a second clock associated with a first device, wherein a difference between the first clock and the second clock is determined during the locking, the method comprising: measuring, by the computing device, a path delay to a second device based on sending one or more messages including one or more first timestamps of the first clock to the second device and receiving one or more messages including one or more second timestamps of a third clock from the second device; and sending, by the computing device, a third message to the second device that includes a third timestamp of the first clock that has been locked to the second clock, wherein the third message includes the path delay, and wherein the third timestamp and the path delay allow the second device to analyze a lock quality of the first clock to the second clock based on a time of the third clock.

In some embodiments, the path delay is inserted in the third message in a correction field of the third message.

In some embodiments, the second device adjusts the third timestamp of the first clock that is locked to the second clock by the path delay to generate an adjusted third timestamp and compares the adjusted third timestamp to the time of the third clock.

In some embodiments, the third clock and the second clock are connected to a same timing source.

In some embodiments, the first clock is adjusted by the difference between the first clock and the second clock to lock the first clock to the second clock.

In some embodiments, the second device is located closer to the computing device compared to the first device.

In some embodiments, the second device is located in a last hop between a path between the first device and the computing device.

In some embodiments, the second device is not physically connected via an interface to the computing device.

In some embodiments, the computing device is not acting as a master clock to the third clock of the second device.

In some embodiments, measuring the path delay to the second device comprises: calculating a roundtrip delay between the computing device and the second device; and dividing the roundtrip delay by two.

In some embodiments, the second device analyzes the lock quality of the first clock to the second clock by: adding the path delay to the third timestamp to determine an adjusted third timestamp; and comparing the adjusted third timestamp to the time of the third clock.

In some embodiments, the second device analyzes the lock quality of the first clock to the second clock by: comparing a difference of the adjusted third timestamp to the time of the third clock to a threshold; and outputting a result of the comparison.

In some embodiments, when the difference is above a threshold, outputting an alert.

In some embodiments, a non-transitory computer-readable storage medium contains instructions performed after locking a first clock of a computing device to synchronize with a second clock associated with a first device, wherein a difference between the first clock and the second clock is determined during the locking, the instructions, when executed, control the computing device to be operable for: measuring a path delay to a second device based on sending one or more messages including one or more first timestamps of the first clock to the second device and receiving one or more messages including one or more second timestamps of a third clock from the second device; and sending a third message to the second device that includes a third timestamp of the first clock that has been locked to the second clock, wherein the third message includes the path delay, and wherein the third timestamp and the path delay allow the second device to analyze a lock quality of the first clock to the second clock based on a time of the third clock.

In some embodiments, the path delay is inserted in the third message in a correction field of the third message.

In some embodiments, the second device adjusts the third timestamp of the first clock that is locked to the second clock by the path delay to generate an adjusted third timestamp and compares the adjusted third timestamp to the time of the third clock.

In some embodiments, the third clock and the second clock are connected to a same timing source.

In some embodiments, the first clock is adjusted by the difference between the first clock and the second clock to lock the first clock to the second clock.

In some embodiments, the second device is located in a last hop between a path between the first device and the computing device.

In some embodiments, an apparatus comprises: one or more computer processors; and a computer-readable storage medium comprising instructions for controlling the one or more computer processors after locking a first clock of the apparatus to synchronize with a second clock associated with a first device, wherein a difference between the first clock and the second clock is determined during the locking, to be operable for: measuring a path delay to a second device based on sending one or more messages including one or more first timestamps of the first clock to the second device and receiving one or more messages including one or more second timestamps of a third clock from the second device; and sending a third message to the second device that includes a third timestamp of the first clock that has been locked to the second clock, wherein the third message includes the path delay, and wherein the third timestamp and the path delay allow the second device to analyze a lock quality of the first clock to the second clock based on a time of the third clock.

System

FIG. 5 illustrates an example of special purpose computer systems 500 according to some embodiments. Computer system 500 includes a bus 502, network interface 504, a computer processor 506, a memory 508, a storage device 510, and a display 512.

Bus 502 may be a communication mechanism for communicating information. Computer processor 506 may execute computer programs stored in memory 508 or storage device 510. Any suitable programming language can be used to implement the routines of some embodiments including C, C++, Java, assembly language, etc. Different programming techniques can be employed such as procedural or object oriented. The routines can execute on a single computer system 500 or multiple computer systems 500. Further, multiple computer processors 506 may be used.

Memory 508 may store instructions, such as source code or binary code, for performing the techniques described above. Memory 508 may also be used for storing variables or other intermediate information during execution of instructions to be executed by processor 506. Examples of memory 508 include random access memory (RAM), read only memory (ROM), or both.

Storage device 510 may also store instructions, such as source code or binary code, for performing the techniques described above. Storage device 510 may additionally store data used and manipulated by computer processor 506. For example, storage device 510 may be a database that is accessed by computer system 500. Other examples of storage device 510 include random access memory (RAM), read only memory (ROM), a hard drive, a magnetic disk, an optical disk, a CD-ROM, a DVD, a flash memory, a USB memory card, or any other medium from which a computer can read.

Memory 508 or storage device 510 may be an example of a non-transitory computer-readable storage medium for use by or in connection with computer system 500. The non-transitory computer-readable storage medium contains instructions for controlling a computer system 500 to be configured to perform functions described by some embodiments. The instructions, when executed by one or more computer processors 506, may be configured to perform that which is described in some embodiments.

Computer system 500 includes a display 512 for displaying information to a computer user. Display 512 may display a user interface used by a user to interact with computer system 500.

Computer system 500 also includes a network interface 504 to provide data communication connection over a network, such as a local area network (LAN) or wide area network (WAN). Wireless networks may also be used. In any such implementation, network interface 504 sends and receives electrical, electromagnetic, or optical signals that carry digital data streams representing various types of information.

Computer system 500 can send and receive information through network interface 504 across a network 514, which may be an Intranet or the Internet. Computer system 500 may interact with other computer systems 500 through network 514. In some examples, client-server communications occur through network 514. Also, implementations of some embodiments may be distributed across computer systems 500 through network 514.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method performed after locking a first clock of a computing device to synchronize with a second clock associated with a first device, wherein a difference between the first clock and the second clock is determined during the locking, the method comprising:
measuring, by the computing device, a path delay to a second device based on sending one or more messages including one or more first timestamps of the first clock to the second device and receiving one or more messages including one or more second timestamps of a third clock from the second device; and
sending, by the computing device, a third message to the second device that includes a third timestamp of the first clock that has been locked to the second clock, wherein
the third message includes the path delay, and wherein the third timestamp and the path delay allow the second device to analyze a lock quality of the first clock to the second clock based on a time of the third clock, wherein the path delay is inserted in the third message in a correction field of the third message.

2. The method of claim 1, wherein measuring the path delay to the second device comprises:
calculating a roundtrip delay between the computing device and the second device; and
dividing the roundtrip delay by two.

3. The method of claim 1, wherein the second device adjusts the third timestamp of the first clock that is locked to the second clock by the path delay to generate an adjusted third timestamp and compares the adjusted third timestamp to the time of the third clock.

4. The method of claim 1, wherein the third clock and the second clock are connected to a same timing source.

5. The method of claim 1, wherein the first clock is adjusted by the difference between the first clock and the second clock to lock the first clock to the second clock.

6. The method of claim 1, wherein the second device is located closer to the computing device compared to the first device.

7. The method of claim 1, wherein the second device is located in a last hop between a path between the first device and the computing device.

8. The method of claim 1, wherein the second device is not physically connected via an interface to the computing device.

9. The method of claim 1, wherein the computing device is not acting as a master clock to the third clock of the second device.

10. The method of claim 1, wherein the second device analyzes the lock quality of the first clock to the second clock by:
adding the path delay to the third timestamp to determine an adjusted third timestamp; and
comparing the adjusted third timestamp to the time of the third clock.

11. The method of claim 10, wherein the second device analyzes the lock quality of the first clock to the second clock by:
comparing a difference of the adjusted third timestamp to the time of the third clock to a threshold; and
outputting a result of the comparison.

12. The method of claim 11, wherein when the difference is above a threshold, outputting an alert.

13. An apparatus comprising:
one or more computer processors; and
a computer-readable storage medium comprising instructions for controlling the one or more computer processors after locking a first clock of the apparatus to synchronize with a second clock associated with a first device, wherein a difference between the first clock and the second clock is determined during the locking, to be operable for:
measuring a path delay to a second device based on sending one or more messages including one or more first timestamps of the first clock to the second device and receiving one or more messages including one or more second timestamps of a third clock from the second device; and
sending a third message to the second device that includes a third timestamp of the first clock that has been locked to the second clock, wherein the third message includes the path delay, and wherein
the third timestamp and the path delay allow the second device to analyze a lock quality of the first clock to the second clock based on a time of the third clock, wherein the second device adjusts the third timestamp of the first clock that is locked to the second clock by the path delay to generate an adjusted third timestamp and compares the adjusted third timestamp to the time of the third clock.

14. A non-transitory computer-readable storage medium containing instructions performed after locking a first clock of a computing device to synchronize with a second clock associated with a first device, wherein a difference between the first clock and the second clock is determined during the locking, the instructions, when executed, control the computing device to be operable for:
measuring a path delay to a second device based on sending one or more messages including one or more first timestamps of the first clock to the second device and receiving one or more messages including one or more second timestamps of a third clock from the second device; and
sending a third message to the second device that includes a third timestamp of the first clock that has been locked to the second clock, wherein the third message includes the path delay, and wherein the third timestamp and the path delay allow the second device to analyze a lock quality of the first clock to the second clock based on a time of the third clock, wherein the path delay is inserted in the third message in a correction field of the third message.

15. The non-transitory computer-readable storage medium of claim 14, wherein the second device is located in a last hop between a path between the first device and the computing device.

16. The non-transitory computer-readable storage medium of claim 14, wherein the second device adjusts the third timestamp of the first clock that is locked to the second clock by the path delay to generate an adjusted third timestamp and compares the adjusted third timestamp to the time of the third clock.

17. The non-transitory computer-readable storage medium of claim 14, wherein the third clock and the second clock are connected to a same timing source.

18. The non-transitory computer-readable storage medium of claim 14, wherein the first clock is adjusted by the difference between the first clock and the second clock to lock the first clock to the second clock.

* * * * *